United States Patent
Scheuerle, Jr. et al.

(10) Patent No.: US 7,827,197 B2
(45) Date of Patent: Nov. 2, 2010

(54) METHOD FOR PROVIDING A PLUGGABLE CUSTOM DATA BINDING SYSTEM

(75) Inventors: Richard Joseph Scheuerle, Jr., Austin, TX (US); Ping Wang, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 263 days.

(21) Appl. No.: 11/002,695

(22) Filed: Dec. 2, 2004

(65) Prior Publication Data

US 2006/0123039 A1    Jun. 8, 2006

(51) Int. Cl.
G06F 7/00    (2006.01)
(52) U.S. Cl. .............. 707/791; 707/793; 707/803; 707/809; 717/118; 719/315
(58) Field of Classification Search .......... 707/791, 707/793, 803, 809; 717/118; 719/315
See application file for complete search history.

(56) References Cited

U.S. PATENT DOCUMENTS

| | | | |
|---|---|---|---|
| 7,000,238 B2* | 2/2006 | Nadler et al. ............ 719/330 |
| 7,159,224 B2* | 1/2007 | Sharma et al. ........... 719/310 |
| 2003/0070006 A1* | 4/2003 | Nadler et al. ............ 709/330 |
| 2003/0191803 A1* | 10/2003 | Chinnici et al. ........... 709/203 |
| 2003/0204645 A1* | 10/2003 | Sharma et al. ........... 709/328 |
| 2004/0216086 A1* | 10/2004 | Bau .......................... 717/114 |
| 2005/0080873 A1* | 4/2005 | Joseph ..................... 709/217 |
| 2005/0114394 A1* | 5/2005 | Kaipa et al. ............. 707/104.1 |
| 2006/0005138 A1* | 1/2006 | Rohwedder et al. ....... 715/748 |

OTHER PUBLICATIONS

Fialli et al., The Java Architecture for XML Binding (JAXB), Sun Microsystems, Inc., pp. 1-228, 2003.*

* cited by examiner

Primary Examiner—Cheyne D Ly
(74) Attorney, Agent, or Firm—DeLizio Gilliam, PLLC

(57) ABSTRACT

The present invention is directed to a pluggable custom data binding system and method utilizing a generic data structure exchanged between a run-time system and a user define binding logic in Web Service Applications. The custom data binding system may replace the existing mappings for XML schema types. The custom binder is a function that works with the pairing of a particular XML schema type and Java type. The custom binder may define an interface including serialize and de-serialize methods to convert between Java objects and SOAPElements. After the custom binder is plugged into the run-time system, this custom binder may interact with the run-time system through use of SOAPElement. The custom binding provider may aggregate related custom binders to support particular custom data bindings. The custom binding provider may be created for a specific application that has a few XML schema types that are not supported by the JAX-RPC specification.

8 Claims, 4 Drawing Sheets

METHOD FOR PROVIDING A PLUGGABLE CUSTOM DATA BINDING SYSTEM

FIELD OF THE INVENTION

The present invention generally relates to the field of computer software, and particularly to a pluggable custom data binding system in Web Service Applications.

BACKGROUND OF THE INVENTION

Many Web Services Applications have utilized complex XML (eXtensible Markup Language) schema definitions to describe their data types. Generally, Web Services Applications exchange data in the form of XML messages that conform to a specific XML schema. XML is an industry-standard, system-independent way of representing data. Like HTML (HyperText Markup Language), XML encloses data in tags, but XML tags relate to the meaning of the enclosed text and XML is extensible. With XML, a user can write his/her own tags to describe the content in a particular type of document. Another aspect of XML's extensibility is that a user can create a schema to describe the structure of a particular type of XML document.

To work directly with an XML schema, programmers often have to work with the low-level XML APIs. In many cases, it is very inconvenient for programmers to use XML APIs such as Document Object Model (DOM) to develop their Web Services applications. It may be easier for Java programmers to deal with Java objects than XML content. Thus, when programmers develop the Web Services Applications, the XML schema types are mapped to appropriate Java types. One of the most popular open standards to define such a mapping is the JAX-RPC specification. However, due to the complexity of XML schemas, some XML schema types are either essentially un-mappable or very difficult to define mappings. For that un-mappable (thus not supported) schema type, JAX-RPC maps them to SAAJ SOAPElement. SAAJ is SOAP (Simple Object Access Protocol) with Attachment API for Java. SOAPElement is one interface defined by SAAJ to represent the raw XML data. Compared to Java class such as Java Bean class, the SOAPElement is a generic data structure that programmers can use to navigate the XML content using the SOAP Attachment API for Java (SAAJ) APIs. As such, mapping to the SOAPElement may be acceptable for certain data centric applications.

However, mapping to the SOAPElement may not be desirable for type centric applications because the SOAPElement deals with the raw SOAP message itself, not the predefined Java type. Further, the SOAPElement may not be the desirable choice even for data centric applications if programmers desire to maintain other data objects such as SDO (Service Data Object). Another problem may occur when programmers desire to define their own mapping rule. In such a case, the standard JAX-RPC mapping may not be applicable especially when programmers already have some legacy Java types suitable for mapping the schema type.

Therefore, it would be desirable to provide a pluggable custom data binding system which could be used to replace or extend the existing mappings for certain schema types. It would be also desirable to provide a custom data binding system which could be pluggable in various deployment scenarios such as server, application, even a web module or the like.

SUMMARY OF THE INVENTION

Accordingly, the present invention provides a pluggable custom data binding system utilizing a generic data structure exchanged between a run-time system and a user defined binding logic in Web Service Applications.

In a first aspect of the present invention, a method of a custom binder interface is provided. A custom binder is an interface implemented to deal with a particular pair of XML schema type and Java type. The custom binder interface may provide serialize and de-serialize methods which convert between Java objects and a generic data structure such as SAAJ SOAPElements. Once the custom binder is recognized (found) by a run-time system, it communicates with the run-time system via the SOAPElement. (The SOAPElement is a particular choice of data structures suitable for being exchanged between a run-time system and a user defined binding logic in accordance with the present invention) For serialization, the custom binder may be invoked by the run-time system and then receive a Java object. The custom binder may convert the Java Object to a SOAPElement (a returned SOAPElement). The run-time may further serialize the SOAPElement (the returned SOAPElement) to a raw message on the wire. The returned SOAPElement may serve as an intermediate form of a SOAP message which may be resulted from serialization. For de-serialization, the run-time system may build an appropriate SOAPElement instance and passes the appropriate SOAPElement instance to the custom binder which then de-serializes it into a Java object. As such, the method of the present invention may allow a user to develop user defined custom binding code in Web Service Application.

In a second aspect of the present invention, a method for providing a custom binding provider is provided. The custom binding provider may be utilized to plug-in a set of custom binders to a run-time system. As such, the method may allow the run-time system or tools to discover proper custom binders. A custom binder deals with a particular pair of XML schema type and Java type. The custom binding provider may aggregate a number of custom binders to support particular applications. The custom binding provider is created for a specific schema file which requires the custom data binding. Further, a custom binding provider may support a number of schema files. The created custom binding provider is declared through a specific XML file to run-time systems. Such a XML file may include all the necessary information for tools and run-time systems to locate the right binder.

In a third aspect of the present invention, a custom data binding system for a Web Service Application is provided. The custom data binding system may replace the existing mappings for XML schema types. The custom data binding system may comprise a custom binding provider and a plurality of custom binders. The custom binder may allow a user to develop user defined custom binding code in Web Service Application. The custom binder is a function that works with the pairing of a particular XML schema type and Java type. A generic data structure such as a SOAPElement may be utilized between the custom binder and the run-time system. The custom binder may define an interface including serialize and de-serialize methods to convert between Java objects and SOAPElements. After the custom binder is plugged into the run-time system, this custom binder may interact with the run-time system through use of SOAPElement. The custom binding provider may aggregate related custom binders to support particular custom data bindings. The custom provider may be packaging of custom binder classes with a declarative metadata file. The custom binding provider may be created for a specific application that has a few XML schema types that are not supported by the JAX-RPC specification.

In an advantageous aspect of the present invention, the custom data binding system may allow programmer not to work directly with the raw XML content once the custom binders are plugged into their system. Instead, the programmers may deal with Java objects and have the run-time system handle the low-level serialization and de-serialization of the Java objects.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
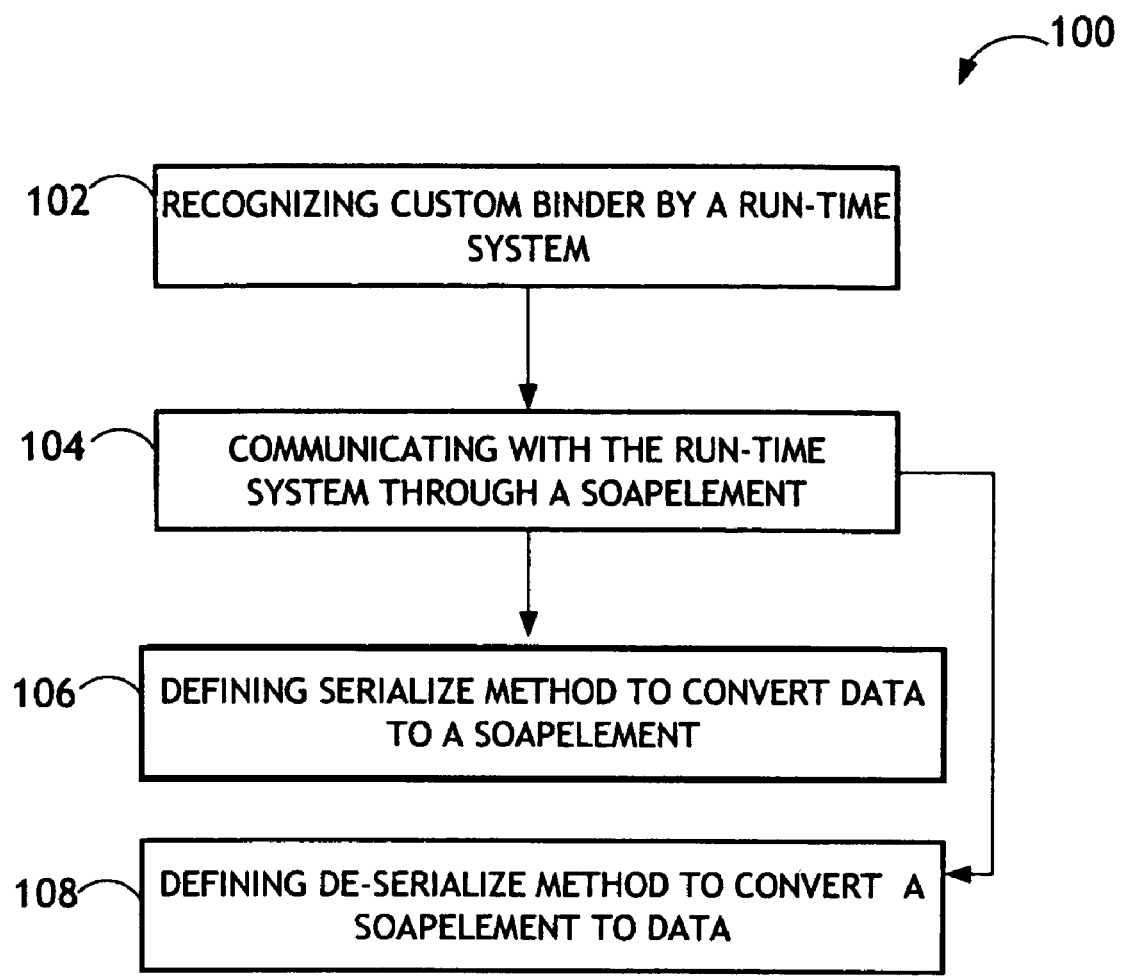
FIG. 1 is an illustration of a flow diagram of a method of a custom binder interface implemented in accordance with an exemplary embodiment of the present invention.

Reference will now be made in detail to the presently preferred embodiments of the invention, examples of which are illustrated in the accompanying drawings.

The present invention is directed to a pluggable custom data binding system utilizing a generic data structure exchanged between a run-time system and a user defined binding logic in Web Service Applications. In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Referring generally now to FIGS. 1 through 5, exemplary embodiments of the present invention are shown.

The Web Services are self-contained, self-describing, modular applications that can be published, located and invoked across the World Wide Web. Clients of these services can aggregate the Web services to form an end-user application, enable business transactions, or create new Web services. Conventionally, a business application sends a request to a Web Service at a given URL using the SOAP protocol over HTTP. The service receives the request, processes it, and returns a response. For example, a Web Service may be a stock quote service, in which the request asks for the current price of a specified stock, and the response gives the stock price. Another example may be a service that maps out an efficient route for the delivery of goods. In such a case, a business sends a request containing the delivery destinations, which the service processes to determine the most cost-effective delivery route. The time it takes to return the response depends on the complexity of the routing, so the response will probably be sent as an operation that is separate from the request. Once a Web Service is deployed, other applications including other Web Services may be able to discover and invoke the deployed service.

Generally, the Web Services exchange data in the form of XML messages that conform to a specific XML schema. In many cases, programmers do not desire to employ XML APIs such as Document Object Model (DOM) to develop their Web services applications. Instead, programmers may desire to deal with Java object and have the run-time system capable of handling the low-level serialization and de-serialization of the Java objects. Often, to work directly with an XML schema, programmers who are used to Java objects, have to work with the low-level XML APIs. The present invention may provide a method and system allowing custom data binding to map various XML schema types (XML schema type unsupported by conventional standards or the like) to desirable Java types in Web Service Applications. As such, the present invention may allow programmers not to work directly with an XML schema. The programmers may manipulate Java objects only and then have the run-time system handle the low-level serialization and de-serialization of the Java objects.

In an embodiment of the present invention, a custom binder which allows a user to develop user defined custom binding code in a Web Service application is defined. The custom binder is a function that works with the pairing of a particular XML schema type and Java type. A generic data structure such as a SOAPElement may be utilized between the customer binder and the run-time system. The SOAPElement is a data structure that programmers can use to navigate the XML content using the SOAP Attachment API for Java (SAAJ) APIs. The custom binder may define serialize and de-serialize methods to convert between Java objects and SOAPElements. After the custom binder is plugged into the run-time system, this custom binder may interact with the run-time system through use of a SOAPElement.

Referring now to FIG. 1, a flow diagram 100 of method implementing a custom binder interface in accordance with an exemplary embodiment of the present invention is shown. In Step 102, the custom binder is recognized (discovered) by a run-time system. Then, the custom binder may be capable of communicating with the run-time system via the SOAPElement in Step 104. The custom Binder may define a serialize method to convert data to the SOAPElement in Step 106.

Figure 2:
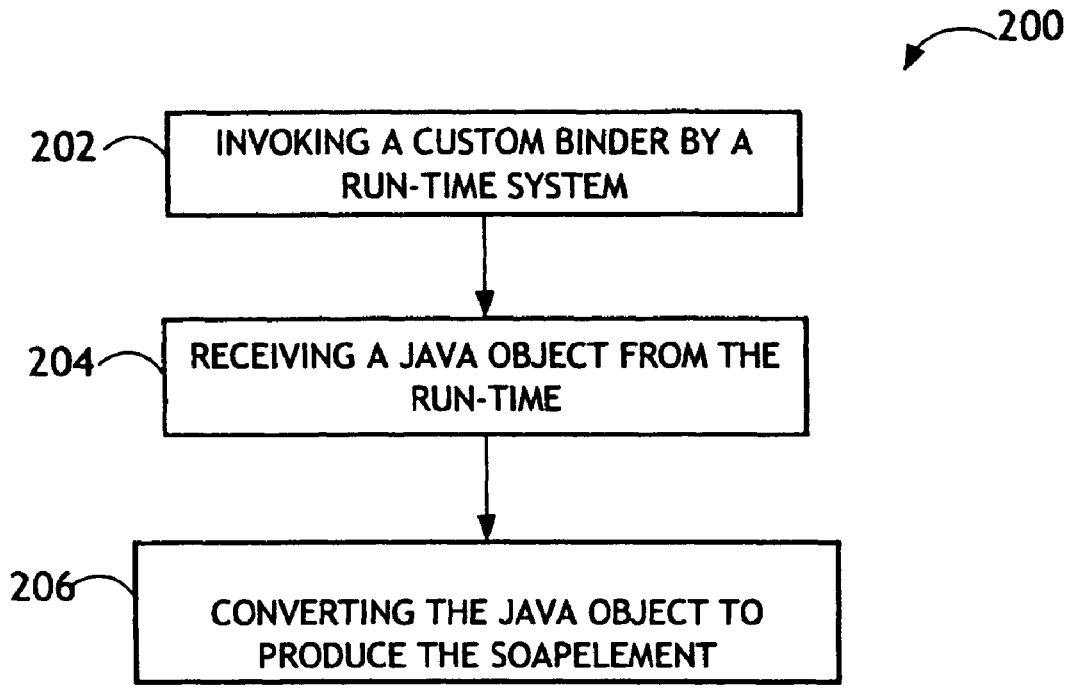
FIG. 2 is an illustration of a flow diagram of a serialize method implemented in the custom binder interface in FIG. 1 in accordance with an exemplary embodiment of the present invention.
Figure 3:
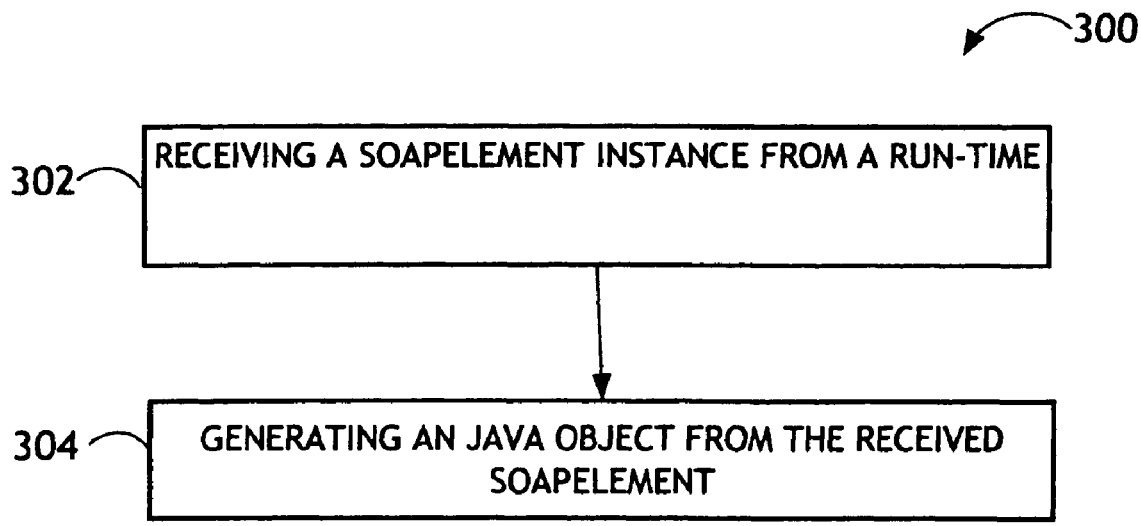
FIG. 3 is an illustration of a flow diagram of a de-serialize method implemented in the custom binder interface in FIG. 1 in accordance with an exemplary embodiment of the present invention.

Referring to FIG. 2, a flow diagram 200 of a serialize method defined by the custom binder in accordance with an exemplary embodiment of the present invention is shown. The custom binder is invoked by the run-time system in Step 202 and then it receives a Java object 204. The Java object may be the data to be serialized. In an embodiment of the present invention, the custom binder may convert the Java Object to a SOAPElement. The run-time may serialize the returned SOAPElement to a raw SOAP message on the wire. It is to be noted that the returned SOAPElement may serve as an intermediate form of a raw SOAP message which is resulted from serialization.

Referring back to FIG. 1, the custom binder may also define a de-serialization method in Step 108. Unlike conventional de-serialize method, the custom binders may not rely on the low-level parsing events such as Simple API for XML (SAX) events from the run-time system to build the Java object. In an embodiment of the present invention, the run-time system first renders the incoming SOAP message into an appropriate SOAPElement form and then passes it to the custom binder for further rendering. Referring to now FIG. 3, a flow diagram 300 of a de-serialize method defined by the custom binder in accordance with an exemplary embodiment of the present invention is shown.

In Step 302, the custom binder may receive a SOAPElement instance from a run-time system. In an embodiment of the present invention, the run-time system may build an appropriate SOAPElement instance and passes the appropriate SOAPElement instance to the custom binder. Then, the custom binder may generate a Java object from the SOAPElement instance in Step 304.

Figure 4:
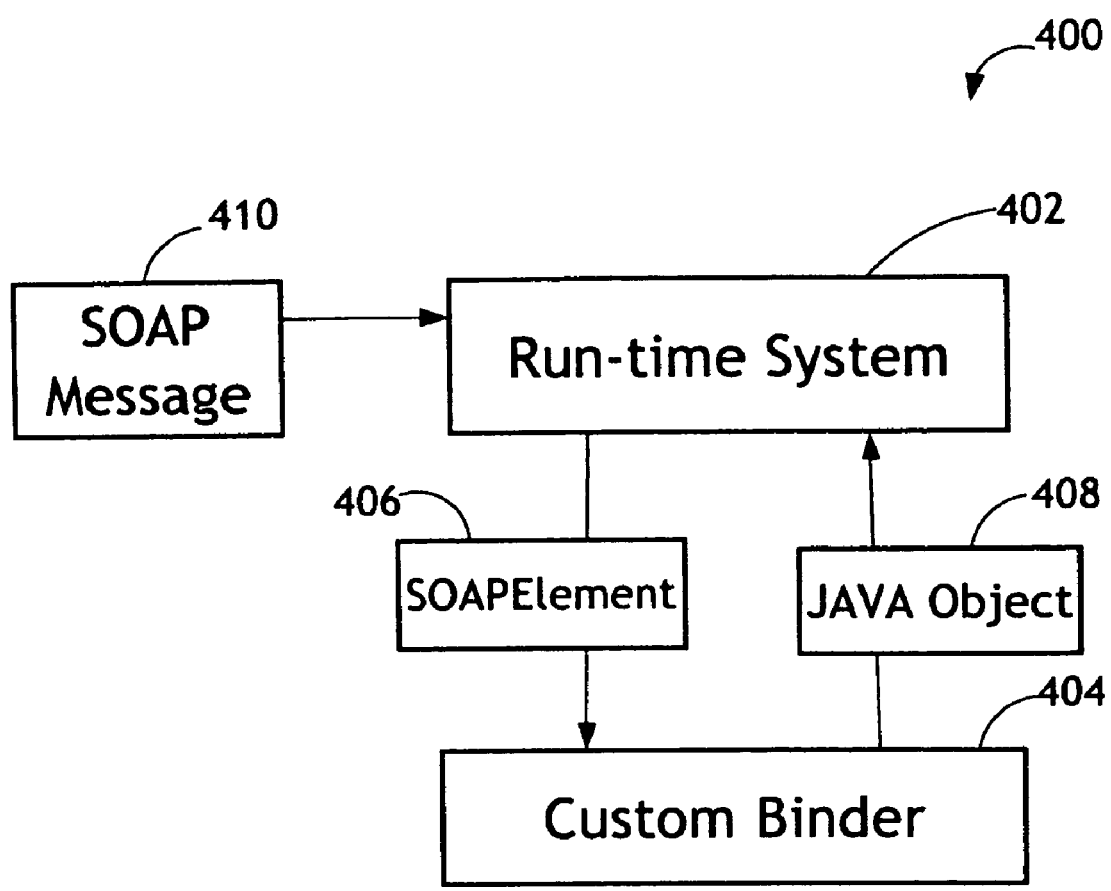
FIG. 4 is an illustration of a block diagram showing interactions between a run-time system and the custom binders in accordance with an exemplary embodiment of the present invention.

Referring to FIG. 4, an illustration of a block diagram 400 showing exemplary interactions between a run-time system 402 and the custom binders 404 is shown. When the run-time system receives a SOAP message 410. The run-time system 402 recognizes an appropriate custom binder 404 for the message and invokes the custom binder 404. The custom binder 404 may interact with the run-time system 402 through use of a SOAPElement 406. The run-time system 402 may build an appropriate SOAPElement 406 based on the received SOAP message 410 and then passes the SOAPElement 406 to the custom binder 404. Through the de-serialize method, the appropriate custom binder 404 extracts the content from the passed SOAPElement and then builds a concrete JAVA object 408.

Figure 5:
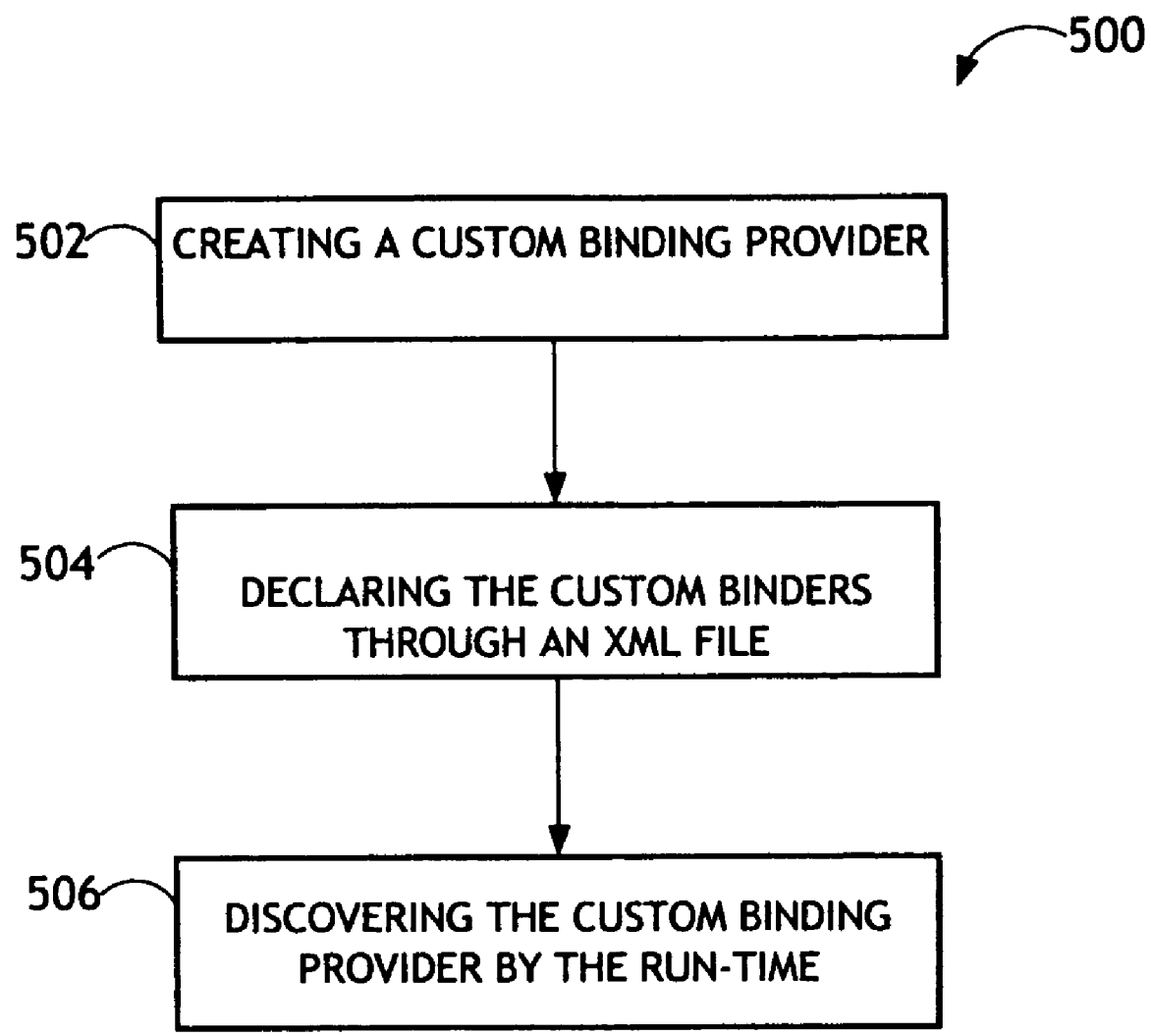
FIG. 5 is an illustration of a flow diagram of a method of providing a custom binding provider implemented in accordance with an exemplary embodiment of the present invention.

Referring now to FIG. 5, an illustration of a flow diagram 500 of a method of providing a custom binding provider is shown. The custom binding provider may be packaging of custom binder classes with a declarative metadata file. Its main purpose is to aggregate related custom binders to support particular user scenarios. In step 502, a custom binding provider is created for a specific application that has a few XML schema types that are not supported by the JAX-RPC specification. In an embodiment of the present invention, a one-to-one relation may be maintained between a custom binding provider and an XML schema file which contains a few schema types for the custom binders to manage. In another embodiment of the present invention, a custom binding provider may be capable of supporting a number of XML schema files.

In Step 504, the created custom binding provider is declared through a specific XML file to run-time systems. Such a XML file may include all the necessary information for the tool and run-time to locate the right binder. In an embodiment of the present invention, the declarative metadata file may be an XML file that is normally packaged along with the custom binder classes in a single Java Archive (JAR) file. After a provider JAR file is packaged, it includes all necessary information (both binaries and metadata file) and is ready to be used by both the tools and the run-time system. In Step 506, the provider is discovered (recognized) by the run-time. The discovered custom binding provider may provide the run-time the necessary information for the user defined mappings and their associated binders.

It should be appreciated that there are various ways to define the custom binder (custom binder interface) and the custom binding provider in a Web Service Application. In a particular embodiment of the present invention, the custom binder interface and the custom binding provider may be defined in IBM WebSphere Application Server V6. For example, the custom binder interface may be defined as follow:

```
public interface CustomBinder {
    public final static String
        QNAME_SCOPE_ELEMENT = "element";
    public final static String
        QNAME_SCOPE_COMPLEXTYPE = "complexType";
    public final static String
        QNAME_SCOPE_SIMPLETYPE = "simpleType";
    public javax.xml.namespace.QName getQName( );
    public String getQNameScope( );
    public String getJavaName( );
    public javax.xml.soap.SOAPElement serialize(
        Object bean,
        javax.xml.soap.SOAPElement rootNode,
        CustomBindingContext context)
        throws javax.xml.soap.SOAPException;
    public Object deserialize(
        javax.xml.soap.SOAPElement source,
        CustomBindingContext context)
        throws javax.xml.soap.SOAPException;
}
```

The CustomBinder interface in this example may have additional properties that are accessible through corresponding methods. The additional properties may include QName for the XML schema type, QName scope, and Java type to which the schema types maps, and the like. It is to be noted that the above described interface is for illustrative purpose only. One of ordinary skills in the art will appreciate that there are various ways to define a custom binder interface that may provide the concrete custom binding for a specific XML schema type in accordance with the present invention.

In a particular embodiment of the present invention, the XML schema for the custom binder provider may be defined as follow:

```
<?xml version="1.0" encoding="UTF-8"?>
<xsd:schema
    targetNamespace=
        "http://www.ibm.com/webservices/customdatabinding/2004/06"
    xmlns:customdatabinding=
            "http://www.ibm.com/webservices/customdatabinding/2004/06"
    xmlns:xsd="http://www.w3.org/2001/XMLSchema"
    elementFormDefault="qualified" attributeFormDefault="qualified">
    <xsd:element name="provider" type="customdatabinding:providerType"/>
```

-continued

```
<xsd:complexType name="providerType">
    <xsd:sequence>
        <xsd:element name="description" type="xsd:string" minOccurs="0"/>
        <xsd:element name="mapping" minOccurs="0" maxOccurs="unbounded">
            <xsd:complexType>
                <xsd:sequence>
                    <xsd:element name="description" type="xsd:string" minOccurs="0"/>
                    <xsd:element name="xmlQName" type="xsd:QName"/>
                    <xsd:element name="javaName" type="xsd:string"/>
                    <xsd:element name="qnameScope"
                            type="customdatabinding:qnameScopeType"/>
                    <xsd:element name="binder" type="xsd:string"/>
                </xsd:sequence>
            </xsd:complexType>
        </xsd:element>
        <xsd:attribute name="scope"
                type="customdatabinding:ProviderScopeType" default="module"/>
    </xsd:sequence>
</xsd:complexType
<xsd:simpleType name="qnameScopeType">
    <xsd:restriction base="xsd:string">
        <xsd:enumeration value="simpleType"/>
        <xsd:enumeration value="complexType"/>
        <xsd:enumeration value="element"/>
    </xsd:restriction>
</xsd:simpleType>
<xsd:simpleType name="ProviderScopeType">
    <xsd:restriction base="xsd:string">
        <xsd:enumeration value="server"/>
        <xsd:enumeration value="application"/>
        <xsd:enumeration value="module"/>
    </xsd:restriction>
</xsd:simpleType>
</xsd:schema>
```

The top-level type of the above describes exemplary XML schema is the providerType that contains a list of mapping elements. Each mapping element defines the associated custom binder and some properties including QName for a XML type, Name for a JAVA type, a way defining an anonymous XML type or the like. Corresponding properties may be also defined by associated custom binder. The providerType also has an attribute called scope which has a value of server, application or module. The scope attribute is normally used by server deployment to resolve the conflict and to realize a custom binding hierarchy. The exemplary XML schema for the custom binding provider may show how the custom mapping is defined to extend or replace the existing JAX-RPC mapping. It is to be noted that the above described XML schema is for illustrative purpose only. One of ordinary skills in the art will appreciate that there are various ways to define a declarative model (e.g. a custom binding provider) that can be used to plug-in a set of custom binders to either emitter tools or a run-time system in accordance with the present invention.

Advantageously, the custom binders in the present invention may be deployed in various ways to provide additional flexibility beyond the standard JAX-RPC mapping. In an embodiment of the present invention, the custom binders may be deployed at the server level so that all the applications that run at this server are affected by the deployed custom data binders. This may be preferred when some fundamental XML types are introduced but are not supported by the standard JAX-RPC mapping. Such a situation may occur frequently for new Web services specifications, which tend to define some new schema types, for example, Web Service-Addressing specification defines an EndpointReferenceType schema type which is not supported by JAX-RPC mapping rules. Because the server class-path is required to be augmented, the server level deployment may have a significant impact on the server run-time and affects all the installed applications.

In another embodiment of the present invention, the custom binders for one or more applications may be deployed so as to affect those applicable applications only. This may be preferred when relevant XML schema types are applicable to a set of applications. In this manner, the custom binding may be shared within one set of applications and yet isolated between different sets of applications. Yet, in another embodiment of the present invention, the custom binders may be deployed for a specific Web module within an application so that only that Web module is affected by the deployed custom binders. This may be preferred when the finest granularity for custom binding is required.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of mapping Java types to extended markup language schema types, comprising:
   mapping at least one markup language schema to at least one Java type to define at least one custom binder associated with the markup language schema/Java type pair, wherein mapping of the at least one markup language schema to the at least one Java type is unsupported by Java Application Programming Interface for XML-based Remote Procedure Call (JAX-RPC);
   receiving at least one Java object employing the at least one Java type;
   selecting a custom binder according to the at least one Java type of the at least one Java object;
   serializing the Java object employing the at least one Java type to a Simple Object Access Protocol (SOAP)Element generic data structure via the custom binder; and
   serializing the SOAPElement to a SOAP message employing the at least one markup language schema.

2. The method as described in claim 1, wherein the at least one markup language schema is in accordance with an extensible markup language.

3. The method as described in claim 1, wherein the custom binder is implemented by a binding provider.

4. The method as described in claim 3, wherein the binding provider aggregates a plurality of custom binders to support a particular application.

5. A method of mapping extended markup language schema types to Java types, comprising:
   mapping at least one markup language schema to at least one Java type to define at least one custom binder associated with the markup language schema/Java type pair, wherein mapping of the at least one markup language schema to the at least one Java type is unsupported by Java Application Programming Interface for XML-based Remote Procedure Call (JAX-RPC);
   receiving a Simple Object Access Protocol (SOAP) message employing the markup language schema;
   selecting a custom binder according to the at least one markup language schema of the SOAP message;
   de-serializing the SOAP message to a SOAPElement; and
   de-serializing the SOAPElement to a Java object having the at least one Java type via the custom binder.

6. The method as described in claim 1, wherein the at least one markup language schema is in accordance with an extensible markup language.

7. The method as described in claim 1, wherein the custom binder is implemented by a binding provider.

8. The method as described in claim 7, wherein the binding provider aggregates a plurality of custom binders to support a particular application.

* * * * *